United States Patent [19]

Bankard

[11] Patent Number: 4,721,284
[45] Date of Patent: Jan. 26, 1988

[54] VALVE PLUG DESIGN

[75] Inventor: Michael B. Bankard, Houston, Tex.

[73] Assignee: Norriseal Controls, Houston, Tex.

[21] Appl. No.: 927,581

[22] Filed: Nov. 6, 1986

[51] Int. Cl.$^4$ ............... F16K 25/00; F16K 47/00
[52] U.S. Cl. .................... 251/86; 251/61.5; 251/122; 251/333; 251/357
[58] Field of Search ............ 251/61.2, 61.3, 61.4, 251/61.5, 84, 85, 86, 87, 88, 122, 333, 356, 357

[56] References Cited

U.S. PATENT DOCUMENTS

| 1,831,713 | 11/1931 | Knowlton | 251/333 |
|---|---|---|---|
| 2,014,314 | 9/1935 | Defenbaugh | 251/122 |
| 2,564,569 | 8/1951 | Goehring | 251/61.4 |
| 3,298,389 | 1/1967 | Freeman | 251/122 |
| 3,428,076 | 2/1969 | Lowe | 251/333 |
| 3,472,481 | 10/1969 | Spies, Jr. | 251/86 |
| 4,041,973 | 8/1977 | Rice et al. | 251/61.5 |
| 4,337,788 | 7/1982 | Seger | 251/122 |
| 4,413,646 | 11/1983 | Platt et al. | 251/122 |

FOREIGN PATENT DOCUMENTS

| 11363 | 10/1908 | Denmark | 251/122 |
|---|---|---|---|
| 350520 | 1/1961 | Switzerland | 251/122 |

Primary Examiner—George L. Walton
Attorney, Agent, or Firm—Head & Johnson

[57] ABSTRACT

A special control valve plug is disclosed. It includes the integral combination (1) of a spherical radiused or ball type seating surface and (2) a conically tapered flow control tip. When the valve is closed, the spherical radiused plug seating surface provides a positive fluid seal. When the valve is open, the tapered tip provides precise proportionate and continuously variable control of fluid flow.

4 Claims, 3 Drawing Figures

VALVE PLUG DESIGN

DISCLOSURE STATEMENT

A preliminary patentability search produced the following U.S. Pat. Nos. 82,270, 355,487, 673,651, 982,195, 1,948,629, 2,014,314, 2,026,793, 2,290,177, 3,127,905, 3,180,349, 3,282,296, 3,508,739, 3,762,436, 3,820,558.

None of these show a fluid control valve with a valve plug member having this combination of a spherical section integral with a conical section or sections such that the spherical section provides a positive seal against fluid flow and the conical section(s) provide regulation of fluid flow.

BACKGROUND OF THE INVENTION

1. Field of Invention

This invention relates to an improved control valve intended both for positive shut-off and precise characterized flow control of fluid through a valve body.

2. Background

In the valve industry the state-of-the art appears to be such that automated (pneumatically or electrically operated) flow control valves are generally offered with two basic trim (plug and seat) types. One type is the quick opening or "On-Off" trim. The optimum quick opening trim design is one that should produce a maximum fluid flow with minimum plug lift and also provide exceptional shut off (minimal leak rate). Quick opening trim normally operates either in the fully opened (On) position or the fully closed (Off) position. The second type is throttling trim which is readily available in contour forms or "characteristics" such as equal percentage, linear, parabolic, square root, and modified percentage. A trim characteristic is generally displayed graphically as a slope or curve which depicts the relationship of fluid flow volume to plug lift. Characterized trims normally operate at some position between fully open and fully closed.

The quick opening type plugs are frequently manufactured by brazing a metallic ball onto the end of the valve stem whereas the throttling type plugs are usually machined from solid bar material. The radiused ball shape of the quick opening plug serves as both the plug contour (On-Off control) and also the plug seating area. The plug seating area is the actual surface of the plug which contacts the valve seat in the closed position to prevent fluid flow through the valve. In the prior art, characterized plugs have typically been manufactured with various angles resulting in both conically shaped control tips and seating surfaces. The radiused ball type plug which has been used by many valve manufacturers for years is renowned for its inherent feature of self-centering and alignment with the valve seat orifice and superior shut off over the conical plug designs, but its use has been limited solely to the quick opening characteristics to the best of my knowledge.

SUMMARY OF THE INVENTION

The control valve unit is comprised of a valve subassembly (body, plug, seat, bonnet, stem and seal) that contains a fluid under pressure to be controlled as it flows through the valve body and a preferably pneumatically operated actuator subassembly (housing, diaphragm, plates and spring) which positions the valve plug relative to the valve seat as required to regulate the fluid flow at the desired rate (volume per unit of time).

The valve unit includes a valve plug member having a spherical radiused section made integral with a multi-conical tapered section. The spherical radiused plug section when in contact with a specifically matched bevel on the valve seat member provides positive shut-off of fluid flow. The relative positioning of the tapered plug section which extends into the valve seat orifice regulates the plug-to-seat annular clearance thereby providing precise proportionate and repeatable control of fluid flow.

This is a unique combination in that I now have a combination in which one valve plug can provide excellent sealing and also characterized flow control.

It is thus seen that it is an object of this invention to provide a new combination valve in which one integral valve plug provides both (a) excellent sealing and (b) controlled flowing of fluid available in a variety of characteristics.

Various other objects and a better understanding of the invention will be had from the following description taken in conjunction with the drawings.

DETAILED DESCRIPTION OF THE PREFERRED EMBODIMENT

Figure 1:
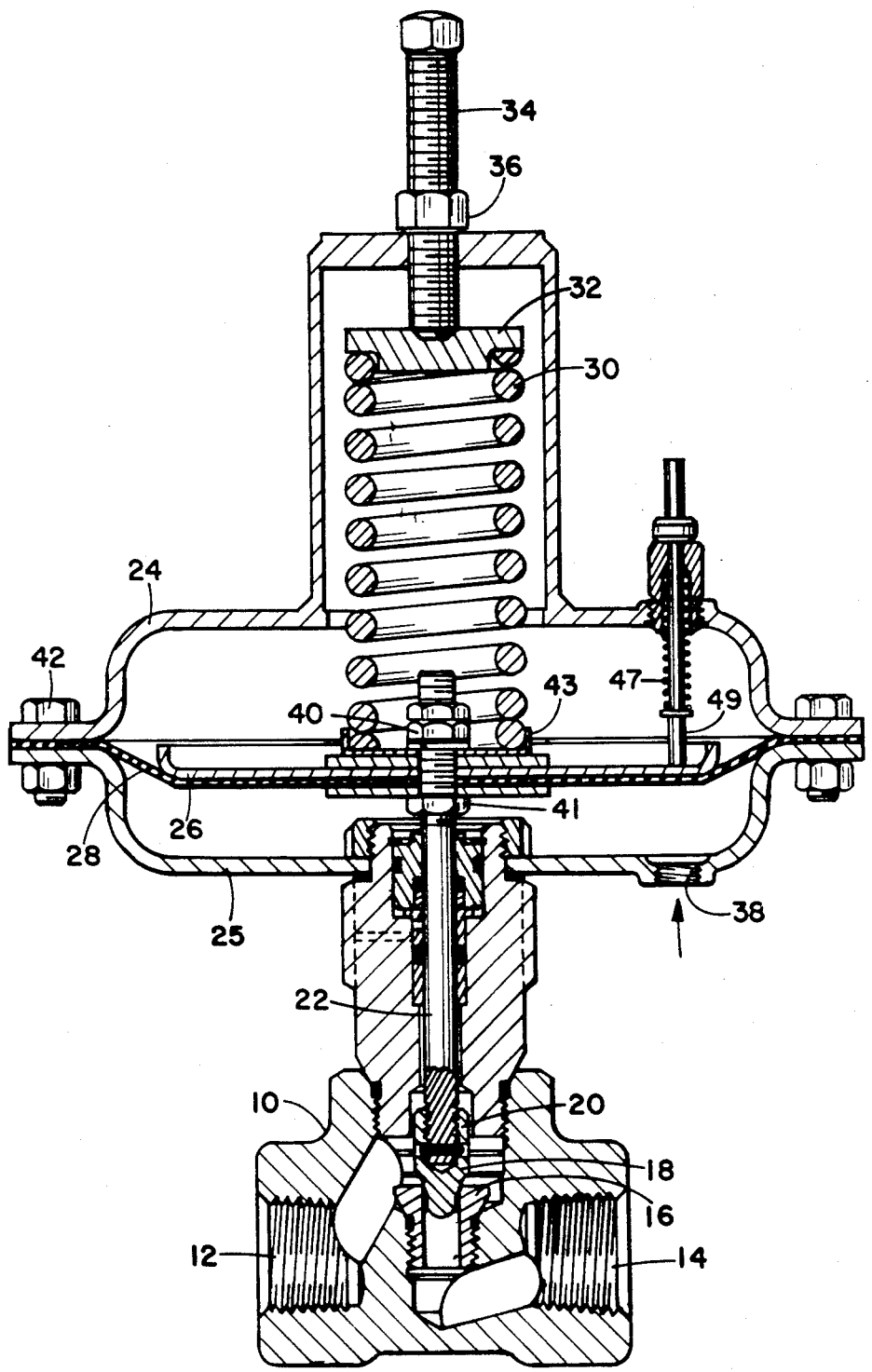
FIG. 1 illustrates a control valve unit mostly in section.

The improved new valve model is shown in FIG. 1 with a reverse acting (normally closed) actuator in which the actuator proper may be of a conventional type. Shown in FIG. 1 is a valve body 10 having an inlet port 14 and an outlet port 12. The valve body has a passage from the inlet port 14 to the outlet port 12 and includes a valve seat 16 in this passage. Valve plug 18 is supported on the lower end of valve stem 22 and is adapted for both positive sealing and characterized fluid flow control through the orifice of the valve seat 16. The particular contour and design and structure of the valve plug 18 and valve seat 16 will be discussed and shown more clearly in regard to FIG. 2. However, it can be said that valve plug includes an upper radiused section and lower generally conical sections. Valve stem 22 is connected to diaphragm plate 26 in a conventional manner including nuts 40 and 41. The diaphragm plate 26 is supported on diaphragm 28 which is included in a diaphragm housing assembly which consists of an upper diaphragm housing section 24 and a lower diaphragm housing section 25 held together by bolts 42. The upper diaphragm housing section 24 is provided with a cylindrical extension which contains actuator spring 30 which is held in position by upper spring holder 32. The tension in spring 30 is adjusted by bolt 34 with nut 36 in the usual manner. The lower end of actuator spring 30 is held in position by a lower spring holder 43 which is supported by diaphragm plate 26. The lower diaphragm housing section 25 is provided with an air inlet 38 into which the supply tubing or pipe can be connected. The actuator is designed such that when the pressure is relieved the valve will be closed.

Also included is a rod 49 which is held in contact with diaphragm plate 26 by means of a spring 47 to indicate the position of plug 20 within the valve body 10.

Figure 2:
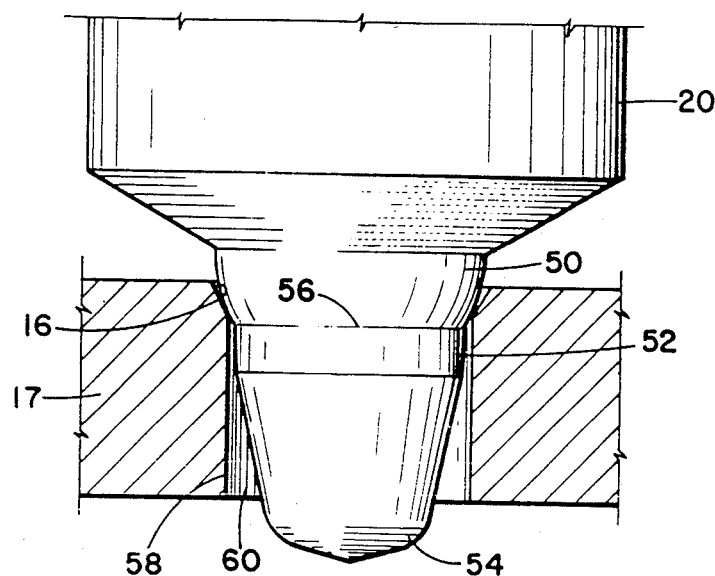
FIG. 2 illustrates the full face view of my plug design which combines a spherically radiused seating section with a multi-conical tapered tip of, but not limited to, the modified percentage flow characteristic and a valve seat orifice shown in section.

Attention is next directed to FIG. 2. Shown in FIG. 2 is an enlarged view of the combination spherical and conical valve plug. Shown thereon is a plug butt 20 which supports a spherical radiused or ball type plug section 50 and characterized conical sections 52 and 54. The spherical section can be defined as that portion of a sphere cut by an upper plane and a lower plane. I preferably provide a characterized plug tip comprising a conical section 54 which is integral with a conical section 52. The characterized sections 52 and 54 can be of any desired size to provide linear, parabolic, square root or modified percentage flow control as may be selected. By characterized flow control I mean a repeatable pre-established industry recognized relationship of fluid flow (valve capacity) to percent of valve opening (plug lift from seat). For descriptive purposes I have selected the modified percentage type plug tip contour as an example representative of flow characterization. The upper conical section 52 is made integral with the radiused section 50. The joining of these two sections defines an imaginary plane 56 which is the lower plane defining the spherical section 50. In the closed position the spherical radiused plug section 50 contacts the beveled seat section 16 at the upper portion of the seat orifice 58 to constitute a tight seal and prevent fluid flow. In the open position as the valve plug lifts away from the seat the rate of fluid flow is governed by the minimum annular area 60 created by the positioning of the conical plug sections 52 and 54 relative to the seat orifice 58.

In addition to the spherical radiused plug seating surface I have further complimented shut-off capability by employing a modified screw thread whereby the major diameter and pitch diameter of the external (stem) thread is purposely machined undersize from that normally accepted. This alteration allows greater lateral plug movement than does a standard thread or rigid plug to stem junction thereby permitting a higher degree of compensation for misalignment between plug and seat as the result of unavoidable manufacturing tolerances. This thread modification serves to enhance the inherent self-centering and alignment properties of my spherical radiused plug section and facilitates obtaining superior shut off.

The materials of the valve plug and valve seat can be steel or other suitable metallics so that I do have metal to metal contact but can obtain a degree of leak free shut off not normally associated with metal to metal sealing members. The amount of permissible fluid volume leakage is proportionate to the seat orifice size and the differential pressure across the orifice tending to produce the leakage. An industry accepted and standardized test for establishing and classifying various degrees of shut-off and seat tightness is prescribed by the American National Standards Institute (ANSI) specification, B16.104. The ANSI standard basically groups shut off into six (6) classes of maximum permissible leakage. Class 1 tends to be associated with inexpensive designs which very well may result in profuse leakage. Class VI shut off is virtually drop or bubble tight and is normally affiliated with more expensive designs which usually employ plastic to metal sealing members. With my plug and seat design I can achieve the most stringent shut off class (ANSI class VI) with what is considered a class IV (metal to metal) design and expense. By accomplishing both exceptionally tight shut off and characterized flow control with a single valve unit, additional flow line components such as secondary block valves and/or actuator power assist devices and the expense thereof can be avoided.

Figure 3:
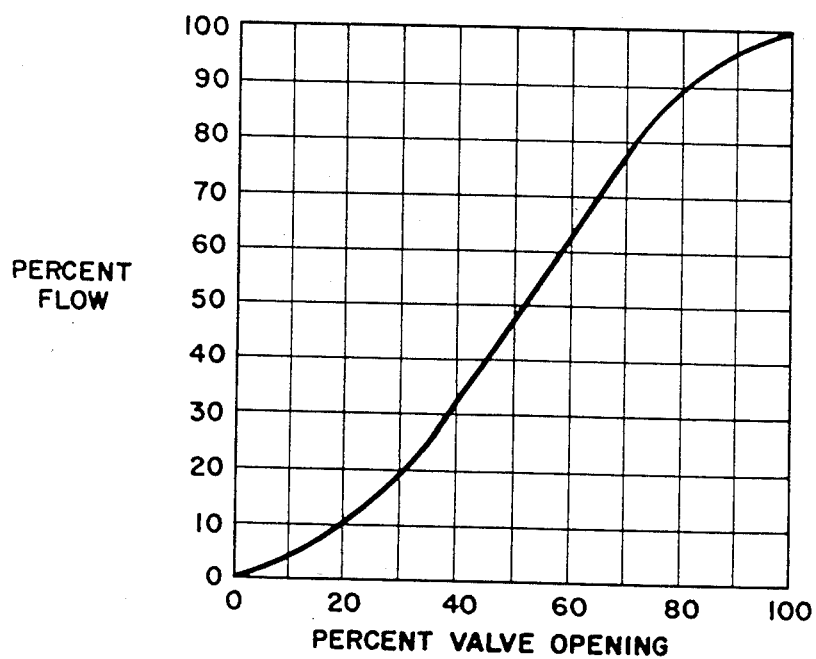
FIG. 3 is a graphic display of the fluid flow to plug lift relationship for the modified percentage characteristic of FIG. 2 valve plug.

As previously stated, the spherical radiused plug seating section can be machined integral with many different tip contours (connical sections) and hence flow characterizations. For illustrative purposes I have selected the modified percentage characteristic for which a flow curve is shown in FIG. 3. The ordinate is percent flow from 0 to 100 and the abcissa is percent valve opening (plug lift) from 0 to 100.

Through size and angular changes in the plug conical sections 52 and 54 and seat orifice section 58 (FIG. 2) the rate of flow increase proportionate to percent valve opening can be accurately tailored for excellent fluid throttling in a variety of characteristics. At the 0 percent flow and 0 percent valve opening the spherical radiused plug seating surface 50 in contact with the specifically matched seat bevel 16 at the top of the seat orifice (58) in conjunction with the modified screw thread of the valve stem achieves a high degree of shut-off (ANSI Class VI) not normally associated with metal to metal (ANSI Class IV) plug and seat designs.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A valve trim set comprising:
   (A) a seat including:
      (i) a circular orifice section;
      (ii) a beveled conical section made an integral part of said orifice section and arranged such that said orifice section provides a passageway for fluid flow and said beveled conical section provides a contact surface for positive sealing;
   (B) a plug including:
      (i) a section of a sphere, said plug having means for achieving a universal positive seating action relative to said circular orifice section;
      (ii) a first conical section made an integral part of said section of a sphere and arranged such that said section of a sphere provides positive sealing and said first conical section provides precise characterized flow control rates that are always continuously varied during a first range of heights of said spherical plug section off said seat beveled conical section as long as said first conical section is within said passageway;
      (iii) a second reduced diameter, conical section made an integral part of said first conical section and arranged such that said second conical section provides precise characterized flow control rates that are always continuously varied during a second range of heights of said spherical plug section off said seat beveled conical section as long as said second conical section is within said passageway; and
      (iv) a contoured point section made an integral part of said second conical section for the streamlining of fluid flow through said orifice section, throughout the first and second range of heights of said spherical plug section off said beveled conical valve seat section, wherein the size and angular changes in the plug conical sections and seat orifice section allows the rate of flow to increase proportionate to the percent of valve opening to achieve excellent fluid throttling in a variety of flow characteristics.

2. A valve trim set as defined in claim 1 including a plug butt section attached to said section of a sphere and containing a threaded hole therein and a valve stem in which the screw thread on the valve stem has a major diameter and pitch diameter of its external thread machined undersize from the normal standard to permit greater lateral plug movement to enhance the inherent self centering and alignment and the sealing capability of the said spherical section.

3. A valve unit comprising:
(A) a seat having;
  (i) a circular orifice section;
  (ii) a beveled conical section integral with said orifice section;
(B) a plug including:
  (i) a section of a sphere, said plug having means for achieving a universal positive seating action irrespective of slight misalignment of said sphere section relative to said circular orifice section;
  (ii) a first conical section made an integral part of said section of a sphere and arranged such that said section of a sphere provides positive sealing and said first conical section provides precise characterized flow control rates that always continuously varied during a first range of heights of said spherical plug section off said seat beveled conical section as long as said first conical section is within said passageway;
  (iii) a second reduced diameter, conical section made an integral part of said first conical section and arranged such that said second conical section provides precise characterized flow control rates that are always continuously varied during a second range of heights of said spherical plug section off said seat beveled conical section as long as said second conical section is within said passageway; and
  (iv) a contoured point section made an integral part of said second conical section for the streamlining of fluid flow through said orifice section throughout the first and second range of heights of said spherical plug section off said beveled conical valve seat section, wherein the size and angular changes in the plug conical sections and the seat orifice section allows the rate of flow to increase proportionate to the percent of valve opening to achieve excellent fluid throttling in a variety of flow characteristics;
(C) a valve stem connected to said plug;
(D) a valve body in which said seat is located and having an inlet and an outlet;
(E) a means to bias said stem in a selected direction; and
(F) a spring to apply force to said plug when in contact with said seat.

4. A valve unit according to claim 3 wherein said plug has a top end and a bottom end, said sections (i) through (iv) being on said bottom end and said top end having a threaded recess therein, and wherein said valve stem has external threads thereon threadably received in said plug threaded recess by which said plug is connected to said stem, and wherein said valve stem threads have a major diameter and pitch diameter machined undersize relative to said plug threaded recess providing limited lateral movement of said plug relative to said stem whereby said plug is self-centering relative to said seat.

* * * * *